(12) United States Patent
Chu

(10) Patent No.: US 10,717,381 B2
(45) Date of Patent: Jul. 21, 2020

(54) ANCHOR TENSION MONITORING SYSTEM

(71) Applicant: GM GLOBAL TECHNOLOGY OPERATIONS LLC, Detroit, MI (US)

(72) Inventor: Benjamin Chu, Fort Wayne, IN (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 172 days.

(21) Appl. No.: 16/047,609

(22) Filed: Jul. 27, 2018

(65) Prior Publication Data
US 2020/0031269 A1  Jan. 30, 2020

(51) Int. Cl.
*B60P 7/08* (2006.01)
*G01L 5/04* (2006.01)
*G01L 5/10* (2020.01)

(52) U.S. Cl.
CPC ............. *B60P 7/0861* (2013.01); *G01L 5/047* (2013.01); *G01L 5/10* (2013.01)

(58) Field of Classification Search
CPC ... B60J 10/24; B60J 10/84; B60J 10/86; B60J 10/80; B60J 5/0479; B60J 10/32; B60J 5/06; B60J 10/30; B60J 10/87
USPC ....... 410/101, 106, 102, 116, 97, 90, 84, 81, 410/77; 248/499, 500, 503, 419, 692, 248/429
See application file for complete search history.

(56) References Cited

U.S. PATENT DOCUMENTS

| | | | | |
|---|---|---|---|---|
| 7,422,085 B2 * | 9/2008 | Kitazawa | ................ | B60R 22/44 180/268 |
| 10,107,381 B2 * | 10/2018 | Niu | ........................ | B60P 7/083 |
| 2006/0095184 A1 * | 5/2006 | Gray | ................ | B60R 21/01532 701/45 |
| 2006/0125219 A1 * | 6/2006 | Kokeguchi | ........... | B60R 21/233 280/735 |
| 2010/0200695 A1 * | 8/2010 | Tsakiris | .................... | B64C 1/20 244/118.1 |
| 2013/0034401 A1 * | 2/2013 | Sauerwald | ............ | B60P 7/0823 410/101 |
| 2014/0363253 A1 * | 12/2014 | Bedient | ................. | B60P 7/0823 410/101 |
| 2016/0152171 A1 * | 6/2016 | Boyer | ................... | B60P 7/0892 410/97 |
| 2017/0129383 A1 * | 5/2017 | Bika | ..................... | B60P 7/0861 |

* cited by examiner

*Primary Examiner* — D Glenn Dayoan
*Assistant Examiner* — Sunsurraye Westbrook

(57) ABSTRACT

A tie down anchor tension monitoring system includes a tension level monitoring module and at least one tie down anchoring point integrated into a cargo carrying space configured for connecting to a free end of a cargo tie down strap. The system further includes at least one tension level monitoring sensor integrated with the at least one tie down anchoring point, wherein the at least one tension monitoring sensor is configured to output a signal to the tension monitoring module that is indicative of a tension level of the cargo tie down strap.

17 Claims, 4 Drawing Sheets

ANCHOR TENSION MONITORING SYSTEM

FIELD

Apparatuses consistent with exemplary embodiments relate to cargo anchor tensioning. More particularly, apparatuses consistent with an exemplary embodiment relate to a cargo anchor tensioning monitoring system.

BACKGROUND

This invention relates to tension level monitoring systems including but not limited to tie strap, ratchet strap and chain and boom type tensioning cargo hold down devices including those securing structures in high winds. Also, the invention will indicate strap/chain slippage, or even deterioration such as strap tearing. The present invention electronically monitors hold down tension and through electronic and mechanical means, communicates to the operator who can monitor load and tension status from virtually any location.

An embodiment of the tension level monitoring system is unique in that it permits the immediate, real time evaluation of a cargo load's securement status while in motion and underway. Conventionally, transportation load status was only possible to evaluate by an immediate stop for physical inspection, exposing transportation operator to potential hazards including inclement weather, traffic, unsteady and shifting loads as well as the inconvenience and loss of production time associated with a full stop. The disclosed tension level monitoring system can profoundly increase safety for cargo loads and individuals alike as well as increase production as load status can be carefully monitored while in motion. The improvement to highway safety alone will be profoundly beneficial as many people are killed or injured every year as a result of transportation load securement failure.

SUMMARY

One or more exemplary embodiments address the above issue by providing a cargo tie down anchor tensioning monitoring system.

According to aspects of an exemplary embodiment, a tie down anchor tension monitoring system includes a tension level monitoring module and at least one tie down anchoring point integrated into a cargo carrying space configured for connecting to a free end of a cargo tie down strap. Another aspect as according to the exemplary embodiment includes at least one tension level monitoring sensor integrated with the at least one tie down anchoring point, wherein the at least one tension monitoring sensor is configured to output a signal to the tension monitoring module that is indicative of a tension level on the cargo tie down strap.

And a further aspect of the exemplary embodiment includes a tension level indicator in communication with the tension level monitoring module operable to provide real time tension level information of the cargo tie down strap to an operator. Still further aspects of the exemplary embodiment are included wherein the tension level monitoring module is an ECU, and wherein the at least one tension level monitoring sensor is a strain gauge. And other aspects wherein the at least one tension level monitoring sensor is a force sensing resistor, and wherein the at least one tension level monitoring sensor is in wireless communication with the tension level monitoring module.

And still in accordance with other aspects of the exemplary embodiment wherein the at least one tension level monitoring sensor is in wired communication with the tension level monitoring module, and wherein the cargo carrying space is a truck bed. And yet other aspects in accordance with the exemplary embodiment wherein the tension level indicator is a driver information center, and wherein the tension level indicator is a wireless device.

BRIEF DESCRIPTION OF THE DRAWINGS

The present exemplary embodiment will be better understood from the description as set forth hereinafter, with reference to the accompanying drawings, in which.

DETAILED DESCRIPTION OF THE INVENTION

The following description is merely exemplary in nature and is not intended to limit the present disclosure, application, or uses thereof.

Figure 1:
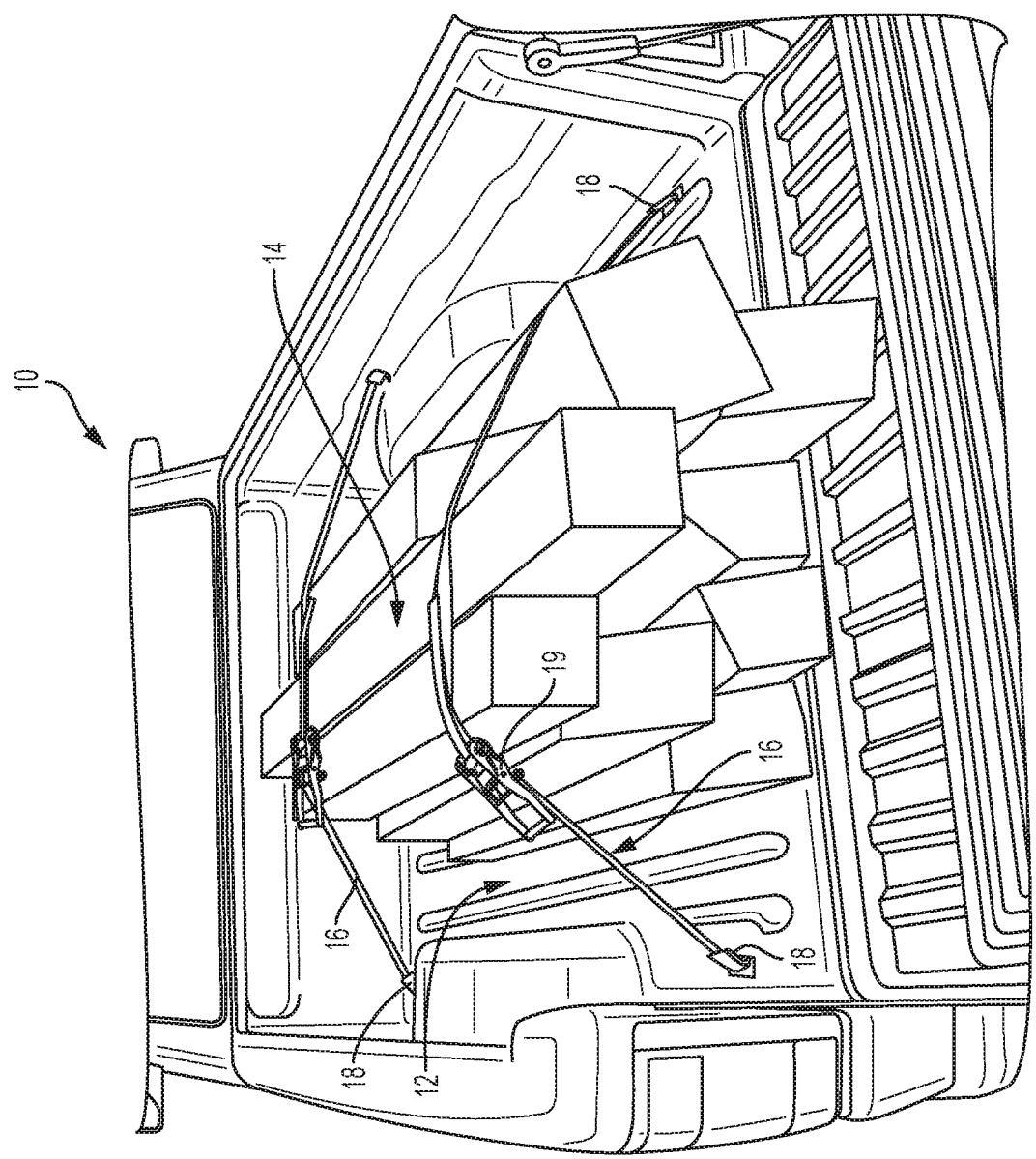
FIG. 1 is an illustration of a loaded cargo carrying space with cargo straps connected to anchor points to secure the load in accordance with an exemplary embodiment.

FIG. 1 provides an illustration 10 of a loaded cargo carrying space 12 with cargo straps 16 connected to anchor points 18 to secure the load 14 in accordance with an exemplary embodiment. The tie-down anchor point 18 may be integrated into the cargo carrying space 12 on the load surface, integrated into the vertical sidewalls of the carrying space 12, integrated into the front wall adjacent the vehicle cab, or on any suitable cargo support rail (not shown) which can have any desired configuration. The tie-down anchor points 18 are of the type for securing cargo by straps 16 to a cargo carrying space 12, such as a pickup truck bed, a flatbed cargo hauler, a railcar, or any other cargo/load transport means. The cargo straps 16 may be formed of any suitable material but most preferably include a mechanism such as a ratcheting lever 19 for adjusting the tension of the strap 16 for securing the cargo during transport.

Figure 2B:
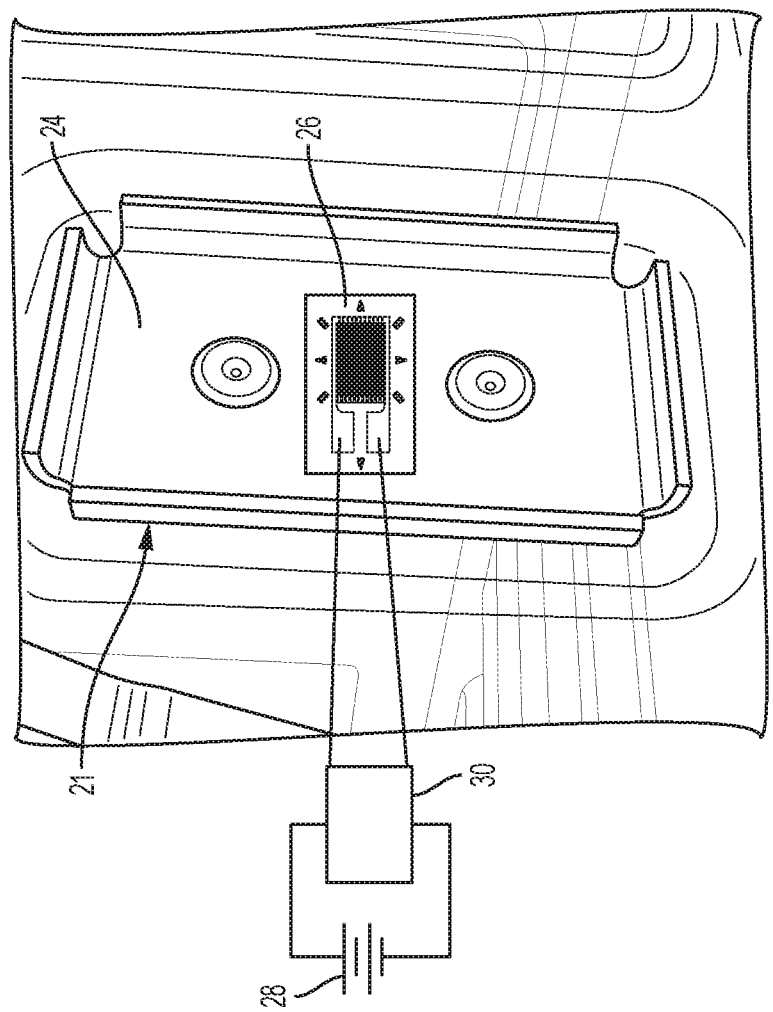
FIG. 2B is an illustration of a rear face of a tie down anchor point base plate including a tension level monitoring sensor in accordance with the exemplary embodiment.
Figure 2A:
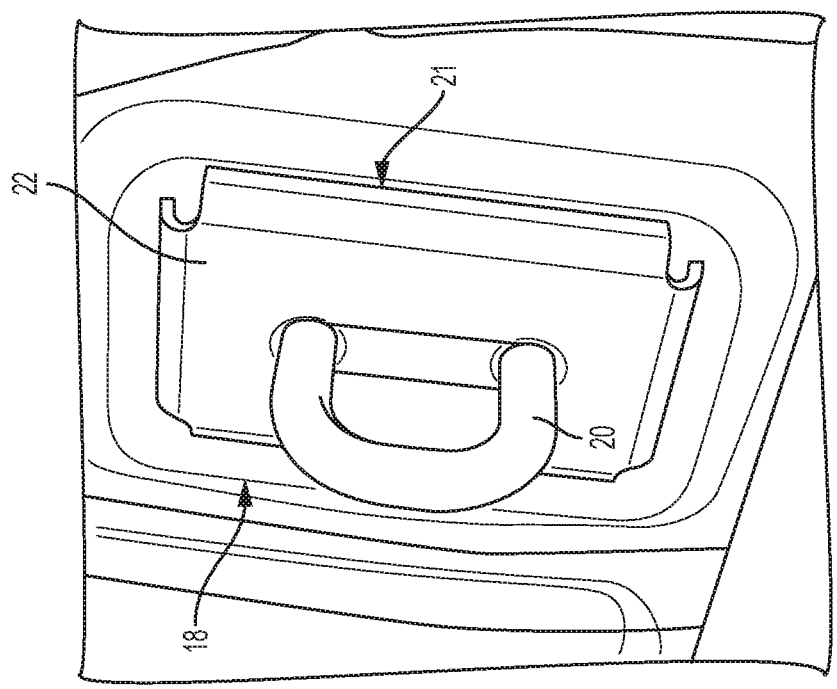
FIG. 2A is an illustration of a front face of a tie down anchor point base plate in accordance with the exemplary embodiment.

Referring now to FIGS. 2A and 2B, illustrations of a front face 22 and rear face 24 of a tie down anchor point 18 in accordance with aspects of the exemplary embodiment are provided. The tie down anchor point 18 includes a connecting ring 20 for connecting to a free end of a cargo tie down strap 16 and a base plate 21. The connecting ring 20 may be in the form of a C or D ring configuration or any other configuration suitable for connecting to a free end of a cargo tie down strap 16. The connecting ring 20 may be formed integral to the base plate 21 through a molding or additive manufacturing process, or joined together using a conventional welding method. Further, the base plate 21 of the tie down anchor point 18 may be attached to a location of the cargo carrying space 12 using a conventional welding method but may also be removably attached in case it is desirable to move the location of the tie down anchor point 18 or replacement becomes necessary if the tie down anchor point 18 becomes damaged.

The rear face 24 of the base plate 21 slightly stands off from the surface of the cargo carrying space 12 such that at least one tension level monitoring sensor 26 can be disposed on the rear face 24 of the base plate 21 as illustrated in FIG. 2B. The at least one tension level monitoring sensor 26 may consist of an insulating flexible backing that supports a metallic foil pattern and may be attached to the rear face 24 of the base plate 21 using any suitable adhesive. The at least one tension level monitoring sensor 26 is also in electrical communication with a power source 28 through a resistive circuit 30 that relates a change in resistance to a change in tension or strain by a quantity known as a gauge factor.

The tension level monitoring sensor 26 takes advantage of the physical property of electrical conductance and its dependence on the geometry of the foil pattern of the tension level monitoring sensor 26. When an electrical conductor is stretched within the limits of its elasticity such that it does not break or permanently deform, it will become narrower and longer, which increases its electrical resistance end-to-end. Conversely, when a conductor is compressed such that it does not buckle, it will broaden and shorten, changes that decrease its electrical resistance end-to-end. From the measured electrical resistance of the at least one tension level monitoring sensor 26, the amount of induced stress may be inferred. When the tie down anchor point 18 is subjected to tension from a cargo strap 16 securing a load in accordance with aspects of the exemplary embodiment, it will cause the base plate 21 to elastically deform which in turn will cause the at least one tension level monitoring sensor 26 to elastically deform. The elastic deformation of the at least one tension level monitoring sensor 26 will cause a change in its electrical conductance which can be used to determine an amount of tension exerted at the tie down anchor point 18. The at least one tension level monitoring sensor 26 may be provided as a strain gauge, a force sensing resistor, a piezo-electric force transducer, or any other force sensing device suitable for the intended purpose.

Figure 3:
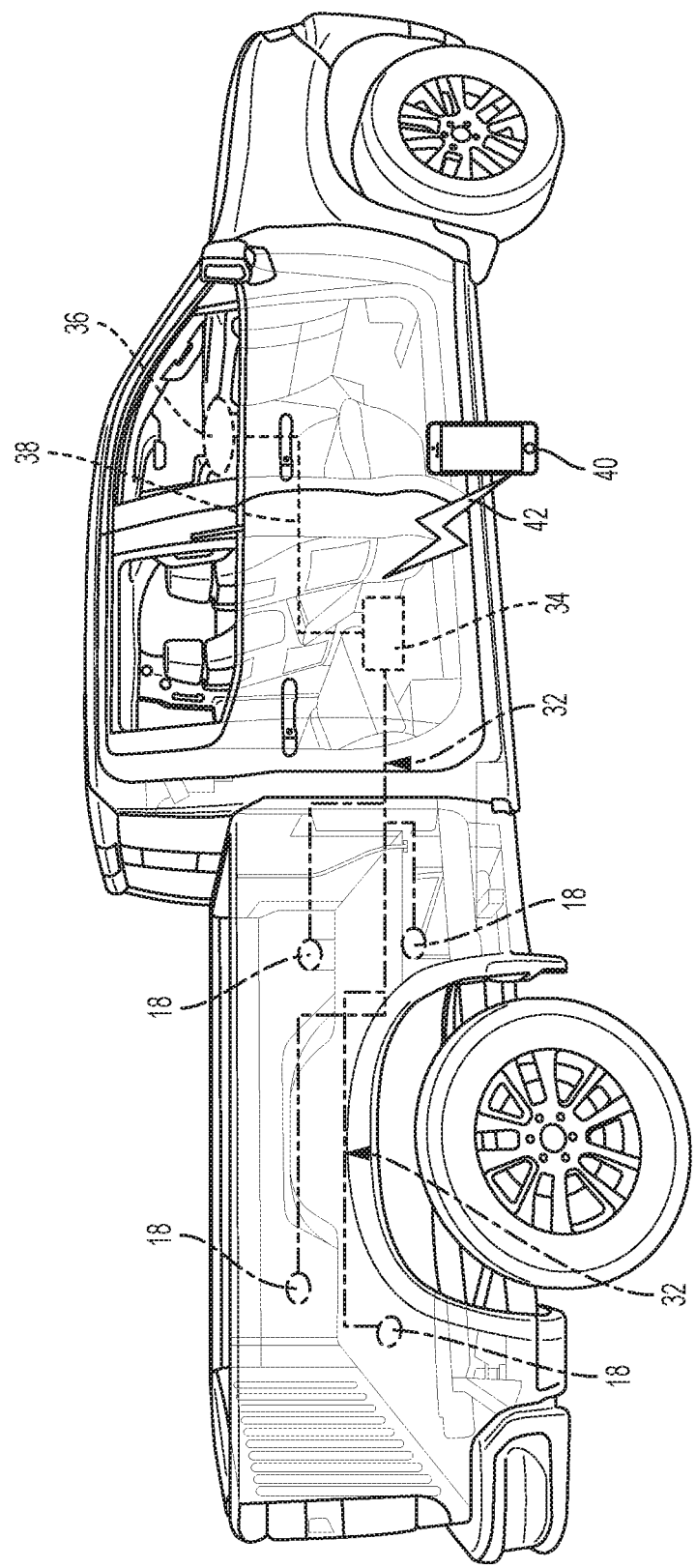
FIG. 3 is an illustration of a system diagram for a tie down anchor tension monitoring system in accordance with the exemplary embodiment.
Figure 4:
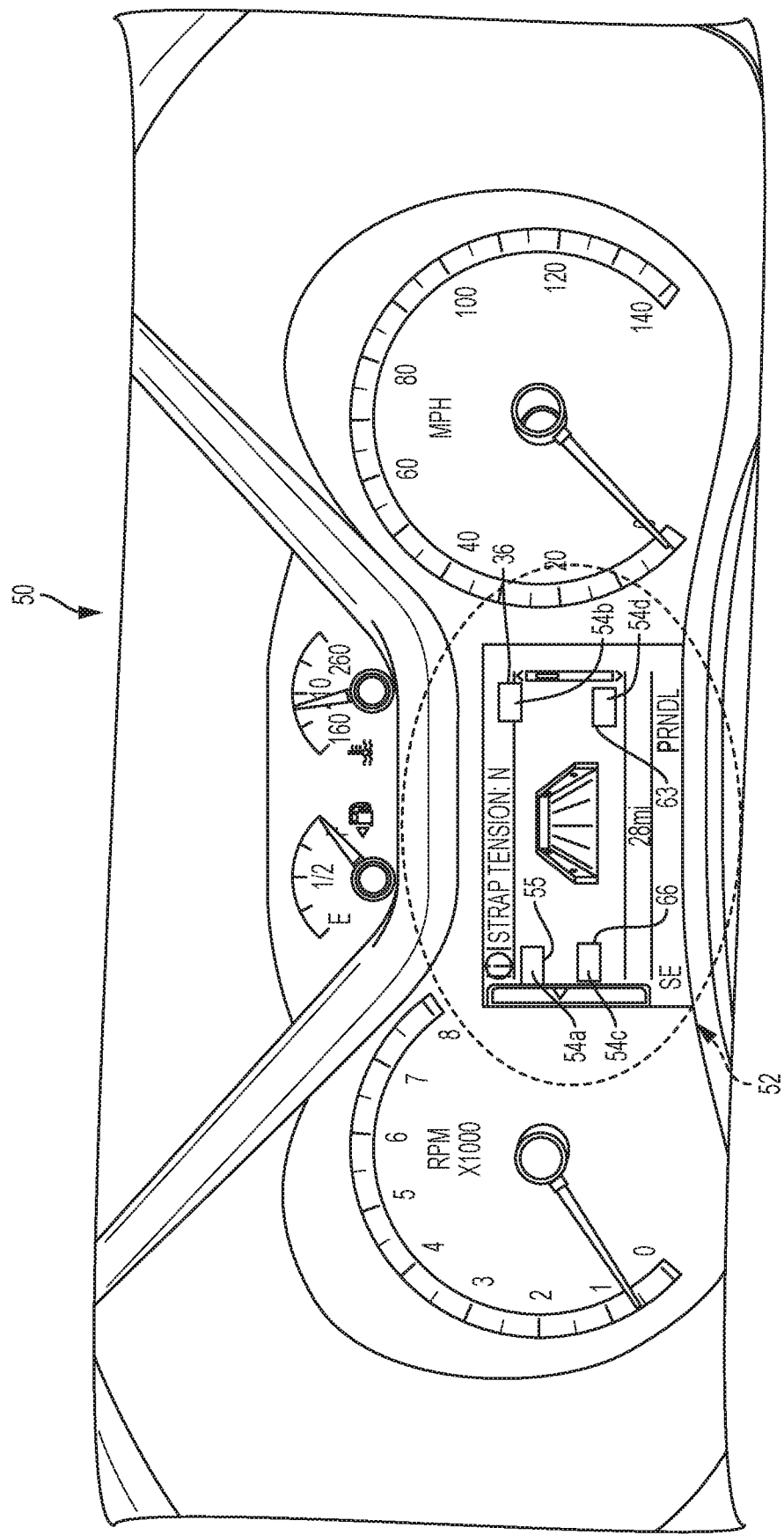
FIG. 4 is an illustration of a tension level indicator in accordance with the exemplary embodiment.

FIG. 3 is an illustration of a system diagram for a tie down anchor tension monitoring system in accordance with the exemplary embodiment. The system includes at least one tie down anchoring point 18 that may be in wired or wireless communication with tension level monitoring module 34 such as an electronic control unit (ECU) via an appropriate wired or wireless communication channel 32. The ECU 34 is operative to receive a data signal from the at least one tension level monitoring sensor 26 associated with the at least one tie down anchoring point 18, and operable determine a distinct tension level associated with each individual sensor. As such, each tension level monitoring sensor 26 is associated with a unique identifier that is recognized by the ECU 34 for determining unique tension level information for each sensor. The ECU 34 may then communicate the unique tension levels associated with each tie down anchoring point 18 to a tension level indicator (36, 40) through a wired connection 38 or a wireless connection 42, respectively. In accordance with exemplary embodiments, the tension level indicator 50 may be a driver information center (DIC) 52 in the vehicle instrument panel as best illustrated in FIG. 4, or a display panel visibly accessible from the exterior of the vehicle (not shown) adjacent the cargo carrying space. Alternatively, the tension level indicator may be a wireless communication device 40 such a smartphone or other portable wireless device having a software application configured for receiving and displaying the tension level information to the user. As best shown in FIG. 4, the tension levels (54a-54d) are different due to the tension levels at each tie down anchor point 18 having different levels of tension exerted on them. In one embodiment, when a tension level goes below a predetermined threshold, the displayed number will turn red and DIC will beep to alert the driver. The DIC may also include an anchor tension monitoring system icon that illuminates when a tie down anchoring point falls below a predetermined threshold similar to a tire pressure monitoring system icon. The icon will alert the driver to promptly check the tension levels of the tie down anchoring points. Having access to this information in real-time can assist the vehicle operator in making appropriate adjustments to the cargo straps 16 after the vehicle is moved to a safe location for making such adjustments.

The description of the invention is merely exemplary in nature and variations that do not depart from the gist of the invention are intended to be within the scope of the invention. Such variations are not to be regarded as a departure from the spirit and scope of the invention.

What is claimed is:

1. A tie down anchor tension monitoring system comprising:
    a tension level monitoring module;
    at least one tie down anchoring point integrated into a cargo carrying space configured for connecting to a free end of a cargo tie down strap; and
    at least one tension level monitoring sensor integrated with the at least one tie down anchoring point, wherein the at least one tension monitoring sensor is configured to output a signal to the tension monitoring module that is indicative of a tension level on the cargo tie down strap.

2. The system of claim 1 further comprising a tension level indicator in communication with the tension level monitoring module operable to provide real time tension level information of the cargo tie down strap to an operator.

3. The system of claim 1 wherein the tension level monitoring module is an ECU.

4. The system of claim 1 wherein the at least one tension level monitoring sensor is a strain gauge.

5. The system of claim 1 wherein the at least one tension level monitoring sensor is a force sensing resistor.

6. The system of claim 1 wherein the at least one tension level monitoring sensor is in wireless communication with the tension level monitoring module.

7. The system of claim 1 wherein the at least one tension level monitoring sensor is in wired communication with the tension level monitoring module.

8. The system of claim 1 wherein the cargo carrying space is a truck bed.

9. The system of claim 2 wherein the tension level indicator is a driver information center.

10. The system of claim 2 wherein the tension level indicator is a wireless device.

11. A tie down anchor tension monitoring system comprising:
    an ECU operative to monitor a tension level signal;
    at least one tie down anchoring point integrated into a truck bed configured for connecting to a free end of a cargo tie down strap; and
    at least one tension level monitoring sensor integrated with the at least one tie down anchoring point., wherein the at least one tension monitoring sensor is configured to output a signal to the ECU that is indicative of a tension level of the cargo tie down strap.

12. The system of claim 11 further comprising a tension level indicator in communication with the ECU operable to provide real time tension level information on the cargo tie down strap to an operator.

13. The system of claim 11 wherein the at least one tension level monitoring sensor is a strain gauge.

14. The system of claim 11 wherein the at least one tension level monitoring sensor is a force sensing resistor.

15. The system of claim 11 wherein the at least one tension level monitoring sensor is in wireless communication with ECU.

16. The system of claim 12 wherein the tension level indicator is a driver information center.

17. The system of claim 12 wherein the tension level indicator is a wireless device.

\* \* \* \* \*